United States Patent
Odinak

(10) Patent No.: US 10,754,978 B2
(45) Date of Patent: Aug. 25, 2020

(54) COMPUTER-IMPLEMENTED SYSTEM AND METHOD FOR STORING AND RETRIEVING SENSITIVE INFORMATION

(71) Applicant: Intellisist, Inc., Seattle, WA (US)

(72) Inventor: Gilad Odinak, Bellevue, WA (US)

(73) Assignee: Intellisist Inc., Seattle, WA (US)

( * ) Notice: Subject to any disclaimer, the term of this patent is extended or adjusted under 35 U.S.C. 154(b) by 0 days.

(21) Appl. No.: 15/661,347

(22) Filed: Jul. 27, 2017

(65) Prior Publication Data

US 2018/0032755 A1  Feb. 1, 2018

Related U.S. Application Data

(60) Provisional application No. 62/368,805, filed on Jul. 29, 2016.

(51) Int. Cl.

| | | |
|---|---|---|
| *G06F 21/00* | (2013.01) | |
| *G06F 21/62* | (2013.01) | |
| *G06F 21/60* | (2013.01) | |
| *H04L 29/06* | (2006.01) | |
| *H04M 3/51* | (2006.01) | |
| *G06F 21/70* | (2013.01) | |
| *H04L 9/08* | (2006.01) | |
| *G06F 21/31* | (2013.01) | |

(Continued)

(52) U.S. Cl.
CPC ........ *G06F 21/6245* (2013.01); *G06F 21/313* (2013.01); *G06F 21/602* (2013.01); *G06F 21/62* (2013.01); *G06F 21/64* (2013.01); *G06F 21/70* (2013.01); *G06Q 30/016* (2013.01); *H04L 9/0822* (2013.01); *H04L 9/0894* (2013.01); *H04L 9/32* (2013.01); *H04L 63/0428* (2013.01); *H04L 63/067* (2013.01); *H04M 3/5166* (2013.01); *H04M 2203/558* (2013.01); *H04M 2203/60* (2013.01)

(58) Field of Classification Search
None
See application file for complete search history.

(56) References Cited

U.S. PATENT DOCUMENTS

| 5,298,890 A | 3/1994 | Kanamaru et al. |
|---|---|---|
| 5,388,252 A | 2/1995 | Dreste et al. |

(Continued)

FOREIGN PATENT DOCUMENTS

| EP | 2924966 A1 | 9/2015 |
|---|---|---|

OTHER PUBLICATIONS

Lamport, "Time, Clocks, and the Ordering of Events in a Distributed System", Communications of the ACM, vol. 21, No. 7, 1978.

(Continued)

*Primary Examiner* — Maung T Lwin
(74) *Attorney, Agent, or Firm* — Stevens & Showalter LLP

(57) ABSTRACT

A computer-implemented system and method for storing and retrieving sensitive information is provided. Segments of sensitive data each encrypted via a single use encryption key and associated with a reference code are maintained. The reference code is received for at least one of the segments of encrypted sensitive data and the encryption key is recreated based on the received reference code. The encrypted sensitive data segment is decrypted using the recreated encryption key and the decrypted sensitive data segment populates a field in a display.

16 Claims, 8 Drawing Sheets

(51) Int. Cl.
*G06F 21/64* (2013.01)
*G06Q 30/00* (2012.01)
*H04L 9/32* (2006.01)

(56) References Cited

U.S. PATENT DOCUMENTS

| | | | |
|---|---|---|---|
| 5,485,569 A | 1/1996 | Goldman et al. | |
| 5,621,454 A | 4/1997 | Ellis et al. | |
| 5,732,394 A | 3/1998 | Nakadai et al. | |
| 5,790,798 A | 8/1998 | Beckett, II et al. | |
| 5,815,138 A | 9/1998 | Tsubaki et al. | |
| 5,818,930 A | 10/1998 | Mark | |
| 5,825,871 A | 10/1998 | Mark | |
| 5,870,079 A | 2/1999 | Hennessy | |
| 5,900,877 A | 5/1999 | Weiss et al. | |
| 5,974,385 A | 10/1999 | Ponting et al. | |
| 6,128,380 A | 10/2000 | Shaffer et al. | |
| 6,263,049 B1 | 7/2001 | Kuhn | |
| 6,269,332 B1 | 7/2001 | Choo et al. | |
| 6,370,574 B1 | 4/2002 | House et al. | |
| 6,477,492 B1 | 11/2002 | Connor | |
| 6,519,699 B2 | 2/2003 | Lu et al. | |
| 6,535,909 B1 | 3/2003 | Rust | |
| 6,583,781 B1 | 6/2003 | Joshi et al. | |
| 6,671,818 B1* | 12/2003 | Mikurak | G06Q 10/06 714/4.21 |
| 6,724,887 B1 | 4/2004 | Eilbacher | |
| 6,754,155 B1 | 6/2004 | Hayashi et al. | |
| 6,862,343 B1* | 3/2005 | Vacek | H04M 3/5166 379/266.1 |
| 6,865,162 B1 | 3/2005 | Clemm | |
| 7,097,108 B2 | 8/2006 | Zellner | |
| 7,343,173 B2 | 3/2008 | Leedom, Jr. | |
| 7,502,741 B2 | 3/2009 | Finke et al. | |
| 7,599,847 B2 | 10/2009 | Block et al. | |
| 7,716,054 B2 | 5/2010 | Harris et al. | |
| 7,728,870 B2 | 6/2010 | Rudnik | |
| 7,752,043 B2 | 7/2010 | Watson | |
| 7,769,176 B2 | 8/2010 | Watson et al. | |
| 7,774,854 B1 | 8/2010 | Watson et al. | |
| 7,882,364 B2 | 2/2011 | Watanabe | |
| 7,996,230 B2 | 8/2011 | Doren | |
| 8,204,180 B1* | 6/2012 | Narayanan | G06F 21/6245 345/626 |
| 8,275,115 B1* | 9/2012 | Everingham | H04M 3/5166 379/265.01 |
| 8,433,915 B2 | 4/2013 | Doren | |
| 8,675,824 B1* | 3/2014 | Barnes | H04M 3/51 379/68 |
| 8,838,982 B2* | 9/2014 | Carlson | G06F 16/9535 713/176 |
| 8,929,517 B1* | 1/2015 | Lavian | H04M 3/493 379/88.11 |
| 9,699,317 B1* | 7/2017 | Pycko | H04M 3/16 |
| 2002/0065668 A1 | 5/2002 | Goodwin | |
| 2002/0083192 A1 | 6/2002 | Alisuag | |
| 2003/0046554 A1 | 3/2003 | Leydier et al. | |
| 2003/0079224 A1 | 4/2003 | Komar | |
| 2003/0120936 A1 | 6/2003 | Farris | |
| 2003/0125958 A1 | 7/2003 | Alpdemir et al. | |
| 2004/0006478 A1 | 1/2004 | Alpdemir et al. | |
| 2004/0064317 A1 | 4/2004 | Othmer et al. | |
| 2004/0068661 A1 | 4/2004 | Dettinger et al. | |
| 2004/0181679 A1 | 9/2004 | Dettinger et al. | |
| 2004/0210637 A1 | 10/2004 | Loveland | |
| 2005/0060539 A1 | 3/2005 | Anspach | |
| 2005/0114379 A1 | 5/2005 | Lee | |
| 2005/0132070 A1 | 6/2005 | Redlich et al. | |
| 2005/0204312 A1 | 9/2005 | Rosel | |
| 2005/0238174 A1 | 10/2005 | Kreitzer | |
| 2005/0256956 A1 | 11/2005 | Littlefield et al. | |
| 2005/0278630 A1 | 12/2005 | Bracey | |
| 2005/0286736 A1 | 12/2005 | Rhoads | |
| 2006/0041428 A1 | 2/2006 | Fritsch et al. | |
| 2006/0056626 A1 | 3/2006 | Keohane et al. | |
| 2006/0085639 A1 | 4/2006 | Phillips et al. | |
| 2006/0111904 A1 | 5/2006 | Wasserblat | |
| 2006/0118614 A1 | 6/2006 | Rose | |
| 2006/0126817 A1 | 6/2006 | Beckett, II et al. | |
| 2006/0129948 A1 | 6/2006 | Hamzy et al. | |
| 2006/0210071 A1 | 9/2006 | Chandran | |
| 2007/0016419 A1 | 1/2007 | Lee et al. | |
| 2007/0016796 A1* | 1/2007 | Singhal | G06Q 20/32 713/183 |
| 2007/0071223 A1 | 3/2007 | Lee et al. | |
| 2007/0076312 A1 | 4/2007 | Jordan | |
| 2007/0124243 A1 | 5/2007 | Hamada | |
| 2007/0124601 A1 | 5/2007 | Singh | |
| 2007/0195945 A1 | 8/2007 | Korenblit et al. | |
| 2008/0005569 A1* | 1/2008 | Watson | G06Q 20/3674 713/176 |
| 2008/0049933 A1 | 2/2008 | Kuroda | |
| 2008/0221882 A1 | 9/2008 | Bundock et al. | |
| 2008/0229230 A1 | 9/2008 | Grigoriev et al. | |
| 2009/0222897 A1* | 9/2009 | Carow | H04L 63/08 726/6 |
| 2009/0307779 A1 | 12/2009 | Doren | |
| 2010/0142710 A1 | 6/2010 | Chrysler et al. | |
| 2010/0254533 A1* | 10/2010 | McCullough | H04L 9/12 380/44 |
| 2011/0022425 A1* | 1/2011 | Block | G06Q 20/206 705/5 |
| 2011/0138191 A1* | 6/2011 | Bond | G06F 21/32 713/189 |
| 2011/0317828 A1* | 12/2011 | Corfield | H04M 3/51 379/265.02 |
| 2012/0215845 A1 | 8/2012 | Aad | |
| 2013/0073859 A1* | 3/2013 | Carlson | G06Q 20/325 713/176 |
| 2013/0104041 A1 | 4/2013 | Seshagiri et al. | |
| 2013/0129072 A1* | 5/2013 | Minert | H04M 3/5141 379/265.09 |
| 2013/0244632 A1 | 9/2013 | Spence et al. | |
| 2013/0246116 A1 | 9/2013 | Bank | |
| 2013/0266127 A1* | 10/2013 | Schachter | G10L 25/48 379/88.01 |
| 2014/0129831 A1* | 5/2014 | Odinak | H04L 9/0861 713/165 |
| 2014/0270142 A1* | 9/2014 | Bischoff | H04M 3/5237 379/265.09 |
| 2015/0010136 A1* | 1/2015 | Lavian | H04M 3/493 379/88.11 |
| 2015/0373768 A1* | 12/2015 | Cohen | H04W 92/02 370/259 |
| 2016/0012465 A1* | 1/2016 | Sharp | G06Q 20/18 705/14.17 |
| 2017/0243013 A1* | 8/2017 | Herlocher | G06F 21/606 |

OTHER PUBLICATIONS

Kopetz, "Clock Synchronization in Distributed Real-Time Systems", IEEE Transactions on Computers, vol. C-36, No. 8, Aug. 1987.

Jardak, Christine; European Search Report; European Application No. 17183895.6; dated Nov. 6, 2017; European Patent Office; Munich, Germany.

Examination Report; European Patent Application No. 17183895.6; dated Jan. 3, 2020; European Patent Office; Munich, Germany.

Jardak, Christine; European Search Report and Opinion; European Patent Application No. 20175388.6; Jun. 22, 2020; European Patent Office; Munich, Germany.

* cited by examiner

Fig. 3.
40

| AGENT: Katy Lee | May 1, 2013 |
| --- | --- |
| ID NO: 4721 | 8:32 am |

ORDER FORM — 45

PURCHASER — 41

- Name: Josh Williams
- ID: D497
- Address: 425 Spring St
- Seattle, WA 98105
- Credit Card No.: Stored — 43
- Exp. Date: Stored — 44

PURCHASE — 42

- Items: XY4276-BIK
- 4792PQ-GRN
- Run CC: Yes / No
- Total cost: $ 47.50
- Notes: Deliver By: 5/7/13

60

70

90

100

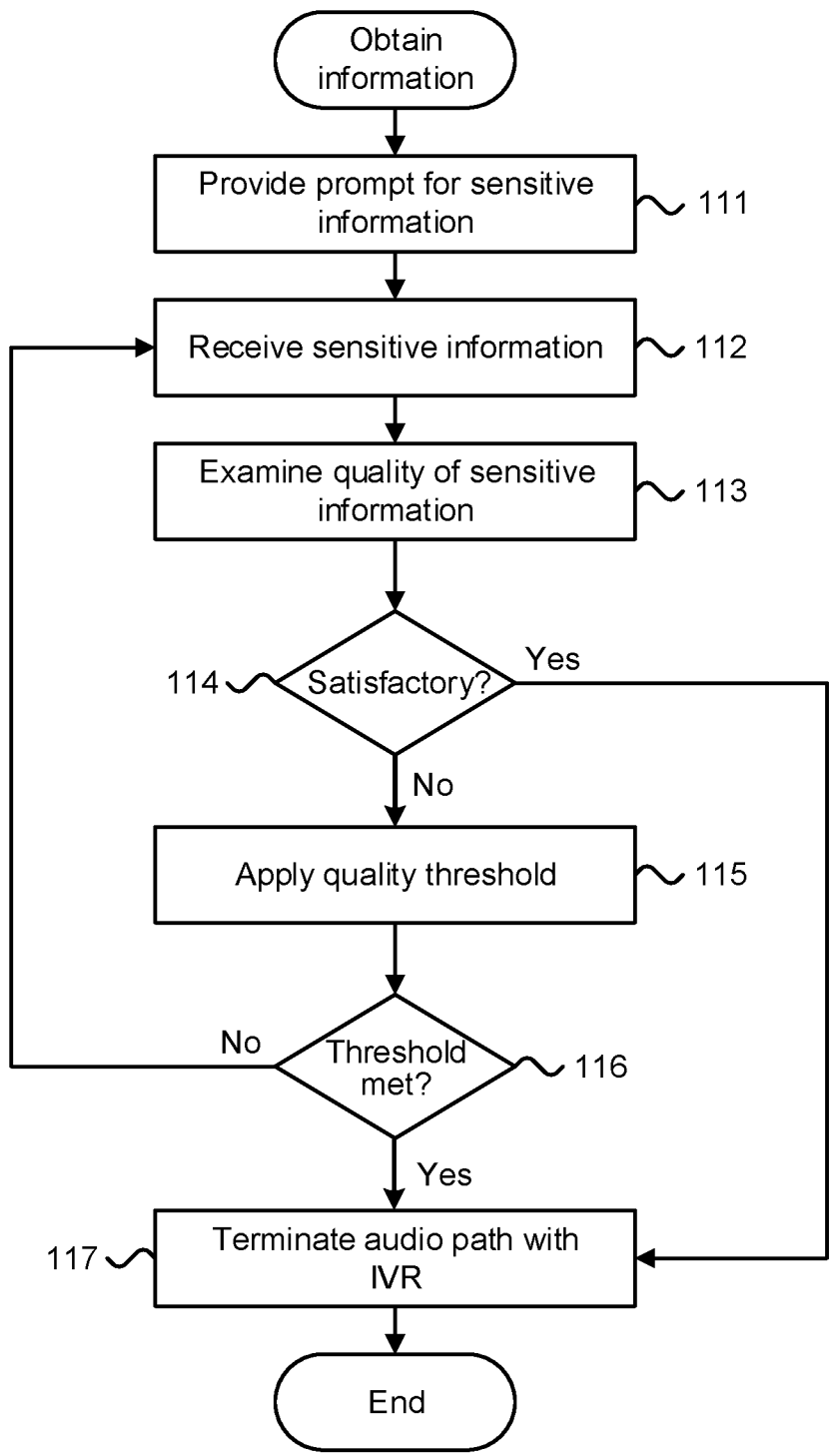

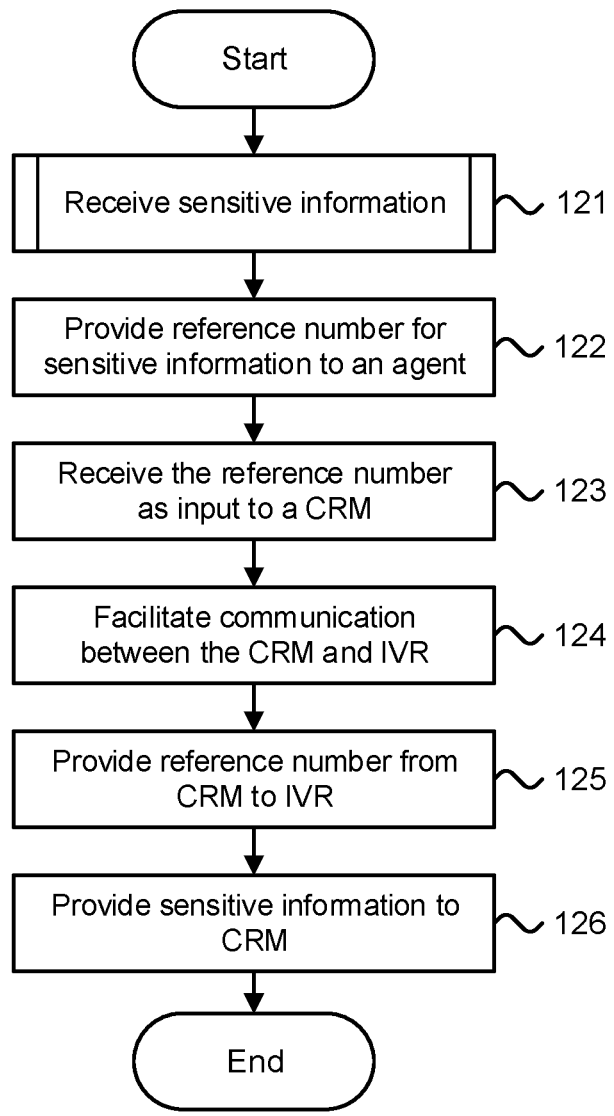

COMPUTER-IMPLEMENTED SYSTEM AND METHOD FOR STORING AND RETRIEVING SENSITIVE INFORMATION

CROSS-REFERENCE TO RELATED APPLICATION

This non-provisional patent application claims priority under 35 U.S.C. § 119(e) to U.S. Provisional Patent application, Ser. No. 62/368,805, filed Jul. 29, 2016, the disclosure of which is incorporated by reference.

FIELD

The present invention relates in general to identifying and protecting sensitive information and, in particular, to a system and method for storing and retrieving sensitive information.

BACKGROUND

Customer call centers, or simply, "call centers," are often the first point of contact for customers seeking direct assistance from manufacturers and service vendors. Call centers are reachable by telephone, including data network-based telephone services, such as Voice-Over-Internet (VoIP), and provide customer support and problem resolution. Although World Wide Web- and email-based customer support are becoming increasingly available, call centers still offer a convenient and universally-accessible forum for remote customer assistance.

Call centers generally provide customer assistance through incoming and outgoing calls. During a call, an agent may obtain personally identifiable information from callers to identify that caller or open an account for the caller. Due to the sensitive nature of the information, the call center may be required to comply with guidelines for managing and storing the information. For example, call centers that process credit card information must comply with the Payment Card Industry (PCI) data security standards to prevent credit card fraud by increasing security and minimizing compromise of credit card related data. As well, medical call centers that deal with information regarding patients' health conditions, care, and payment for provision of the health care, must comply with the Health Insurance Portability and Accountability Act (HIPAA) to protect the privacy and security of the health information.

In conventional call centers, a caller directly provides their sensitive data to an agent, which is then processed. For instance, a caller calls into the call center for assistance with one or more matters. The call can be transferred to an agent who may first verify an identity of the caller by asking personal questions and then assist the caller upon verification. During the call, the agent may request the caller to verbally provide personally identifiable information, such as social security number, credit card information, or health status. The sensitive information can then be entered into a database by the agent or can be recorded during the call for later use. After the call, the sensitive information can be masked or obfuscated within the database or recording to prevent unauthorized access to the information. However, the sensitive information can be accessed by an unauthorized individual, such as an agent, prior to masking. Therefore, the conventional method for obtaining information from a caller leaves the information open to breach by allowing an agent or other individual of the call center to obtain the information.

Accordingly, a system and method to securely identify, receive, and protect sensitive information, such as personally identifiable information, is needed. Preferably, the system and method will use an automated voice response system to accept, manage, and mask the sensitive information in real time.

SUMMARY

Users calling in to a call center must often provide personally identifiable information to resolve a concern. Often times, the call center is required to adhere to guidelines regarding maintaining and storing the personally identifiable information to prevent breach of the information. Conventionally, callers provide their personally identifiable information to an agent at the call center. However, this method of collection leaves the information open to breach by allowing the agent or other individuals to obtain the information. To prevent breach, such as by the agent, the sensitive information is provided to an automated system during a call between a caller and an agent. The agent requests information from the caller and the caller provides the information. When the information requested is identified as sensitive, the caller is transferred to an automated IVR system or a third party to whom the sensitive information is provided. Meanwhile, the agent remains on the line, but is unable to hear the sensitive information provided by the caller. Once the caller has finished providing the sensitive information, the caller automatically rejoins the call and resumes speaking with the agent. The agent receives a message that the sensitive information was received so he can proceed with further requests for information, if necessary.

An embodiment provides a computer-implemented system and method for protecting sensitive information within a call center in real time. A call from a caller is received within a call center. The call is assigned to an agent, and a determination is made as to when the caller is about to provide sensitive information. The user is transferred to an automated voice response system to which the sensitive information is provided, while maintaining the call with the agent. The caller is returned to the agent upon providing the sensitive information. A notification regarding a status of the sensitive information is sent and the call is terminated.

A further embodiment provides a computer-implemented system and method for storing and retrieving sensitive information. Segments of sensitive data each encrypted via a single use encryption key and associated with a reference code are maintained. The reference code is received for at least one of the segments of encrypted sensitive data and the encryption key is recreated based on the received reference code. The encrypted sensitive data segment is decrypted using the recreated encryption key and the decrypted sensitive data segment populates a field in a display.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a screenshot showing, by way of example, a user interface for entering caller information.

FIG. 9 is a flow diagram showing, by way of example, a process for obtaining information from a caller via an IVR.

FIG. 10 is block diagram showing, by way of example, a process for storing and retrieving sensitive information.

DETAILED DESCRIPTION

Conventionally, call centers collect sensitive information from a caller via an agent that asks for the sensitive information, which is subsequently recorded or entered into a database prior to masking. However, breach of the information can occur, such as when the agent discloses the information or otherwise provides the information to another without authorization. Breach can be prevented by bypassing the agent during provision of the sensitive information, such as by transferring the caller during the call to an automated IVR for providing the sensitive information and subsequently providing notice to the agent regarding a status of the sensitive information.

Figure 1:
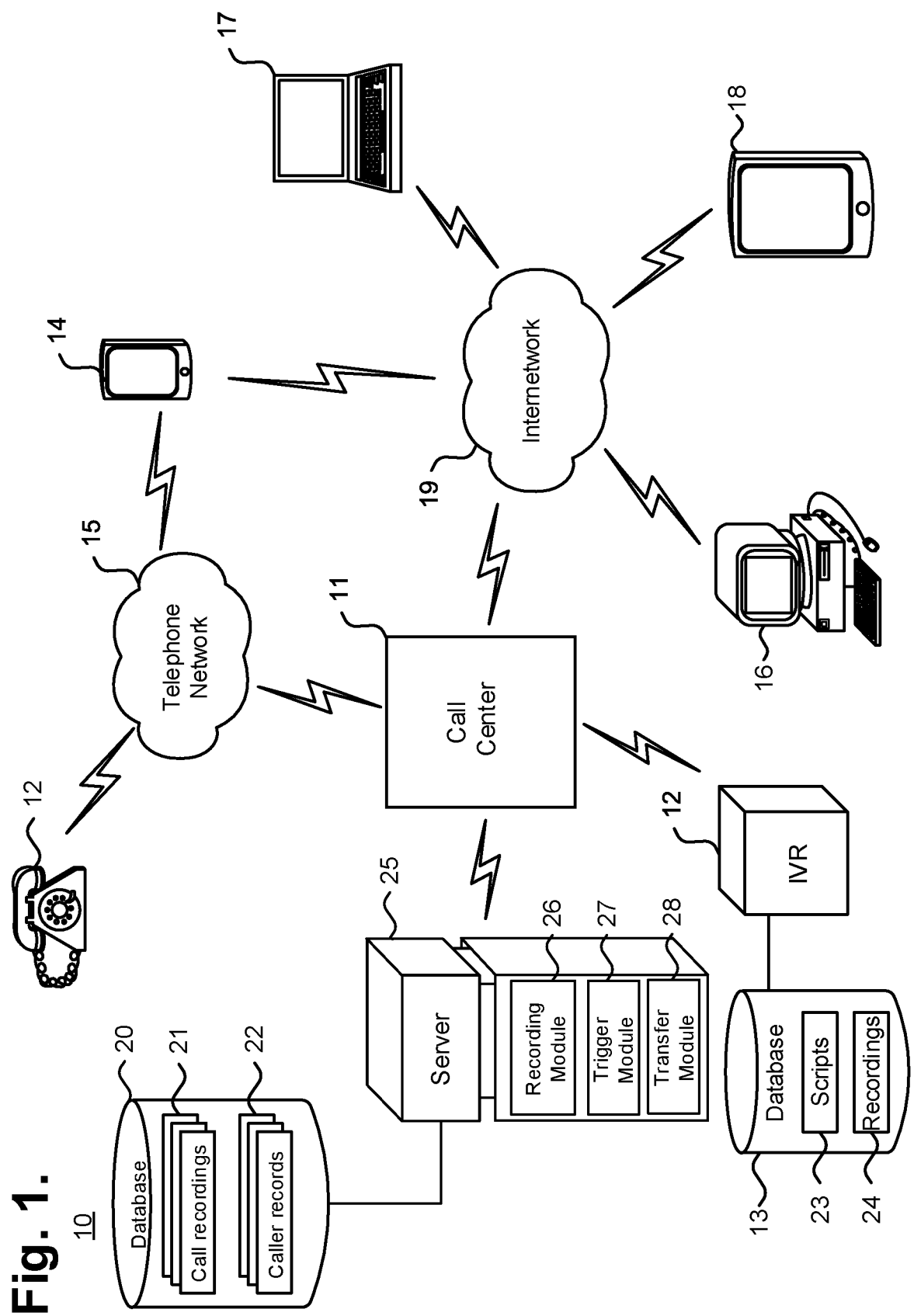
FIG. 1 is a functional block diagram showing an environment for protecting sensitive information within a call center in real time, in accordance with one embodiment.

Information breach can be prevented by securely collecting and masking the information in real time. FIG. 1 is a functional block diagram showing an environment 10 for protecting sensitive information within a call center in real time, in accordance with one embodiment. The call center 11 receives incoming calls from conventional telephone handsets 12 and portable handsets 14 through a telephone network, such as Plain Old Telephone Service (POTS) and cellular and satellite telephone service, respectively. Calls can also be received from desktop 16, portable 17 or tablet 18 computers, including VoIP clients, Internet clients and Internet telephony clients, through an internetwork 19, such as the Internet. In one embodiment, a call can be initiated through a Web application, such as on a smart phone 14, tablet 18, or other type of computing device. For instance, a banking application can include information regarding a user's account, including balance, debits, and deposits, as well as a call button, that automatically initiates a call between the user and a call center of the bank when pressed.

The call center 11 is associated with one or more servers 25 that can be located within the call center or remotely. The server includes a recording module 26, a trigger module 27, and a transfer module 28. The recording module 26 initiates recording of the call upon receipt through termination of the call, while the trigger module 27 identifies a specific trigger indicating subsequent receipt of sensitive information, and the transfer module 28 transfers the call to an interactive voice response (IVR) 12 that is associated with the call center 11 upon receipt of the call or upon identification of the trigger. Specifically, the IVR can be present in the call center 11 or can be located outside of the call center 11 and accessible through the internetwork 19. If the call is initially routed to an IVR, information can be obtained from the caller to determine which agent to assign to the call or to determine a reason for the call. Subsequently, the call can be transferred to an agent, either directly or via the IVR, and the agent can assist the caller and address any concerns.

The call center server 25 is interconnected to a database 20 in which recordings of the calls 21 and caller records 22 can be stored for use during an incoming call or at a later time. For instance, a caller of an incoming call can be identified and the record associated with that caller can be obtained for providing to an agent assigned to handle the incoming call. Further, recordings of the call between the caller and the agent can be stored as a recording 21 for later review and training. The IVR can also be associated with a database 13, which can store scripts 23 for playing to the caller, as well as "canned" recordings 24 for providing to the caller or the agent.

In one embodiment, the agent can select one or more scripts for guidance when interacting with the customer or for playing to the customer during the call. For instance, when an agent identifies a call that matches a recognized problem or frequently asked question, the agent can choose a predefined "script" to prompt and collect or simply provide the customer with information in a step-by-step manner. For example, a script could be used to collect a customer's personal information for a credit application, or to provide instructions on using a feature of a consumer product in a customer support application. The script can be read by the agent, provided to the caller as a canned recording, or provided as generated speech.

At any point during the call, sensitive information can be obtained from the caller to assist the agent in resolving any concerns. The sensitive information can include personally identifiable information, such as address, phone number, social security number, health status, credit card number, and income. However, the information that qualifies as sensitive can be dependent upon the type of business conducted by the call center. For instance, if the call center represents a hospital, HIPAA regulates information regarding an individual's past, present or future physical or mental health, provision of health care provided, medical record number, health plan number, account number, as well as other types of information. However, if the call center takes orders for a retail store, the call center is responsible under PCI to ensure protection of cardholder data, which can include account number, expiration date, name, address, and social security number. A caller that discusses his own medical condition to an agent while ordering a shirt is likely not to be considered sensitive data, while any credit card information provided can be sensitive.

Prior to obtaining the sensitive information, the trigger module 27 of the call center server 25 can identify a trigger for initiating communication between the caller and the IVR. The trigger can include actions of the caller or agent, as well as content of the call, as further described below in detail with reference to FIGS. 4-8. Once the trigger is identified, the transfer module can transfer the caller to an IVR for disclosing the sensitive information, such as by cutting the audio path between the caller and the agent and patching the caller with the IVR, while the agent remains on the call line. In one embodiment, the transfer of the caller to the IVR occurs inbound and no telephony interaction is required. The IVR can be the same as the IVR 12 with which the user interacted with previously, or a different IVR.

The handsets 12, 14, computers 16-18, IVR, and call center, each include components conventionally found in programmable computing devices, such as a central processing unit, memory, input/output ports, network interfaces, and non-volatile storage, although other components are possible. Moreover, other information sources in lieu of or in addition to the servers, and other information consumers, in lieu of or in addition to the handsets and computers, are possible.

Additionally, the handsets 12, 14, computers 16-18, server 25, and IVR can include one or more modules for carrying out the embodiments disclosed below. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the computing devices and server can act as a specialized computer. For instance, when the modules are implemented as hardware, that particular hardware is specialized to perform message prioritization and other computers cannot be used. Additionally, when the modules are burned into read-only memory components, the computing device or server storing the read-only memory becomes specialized to perform the message prioritization that other computers cannot. Other types of specialized computers are possible for the handsets, computers, server, and IVR for use within the call center. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
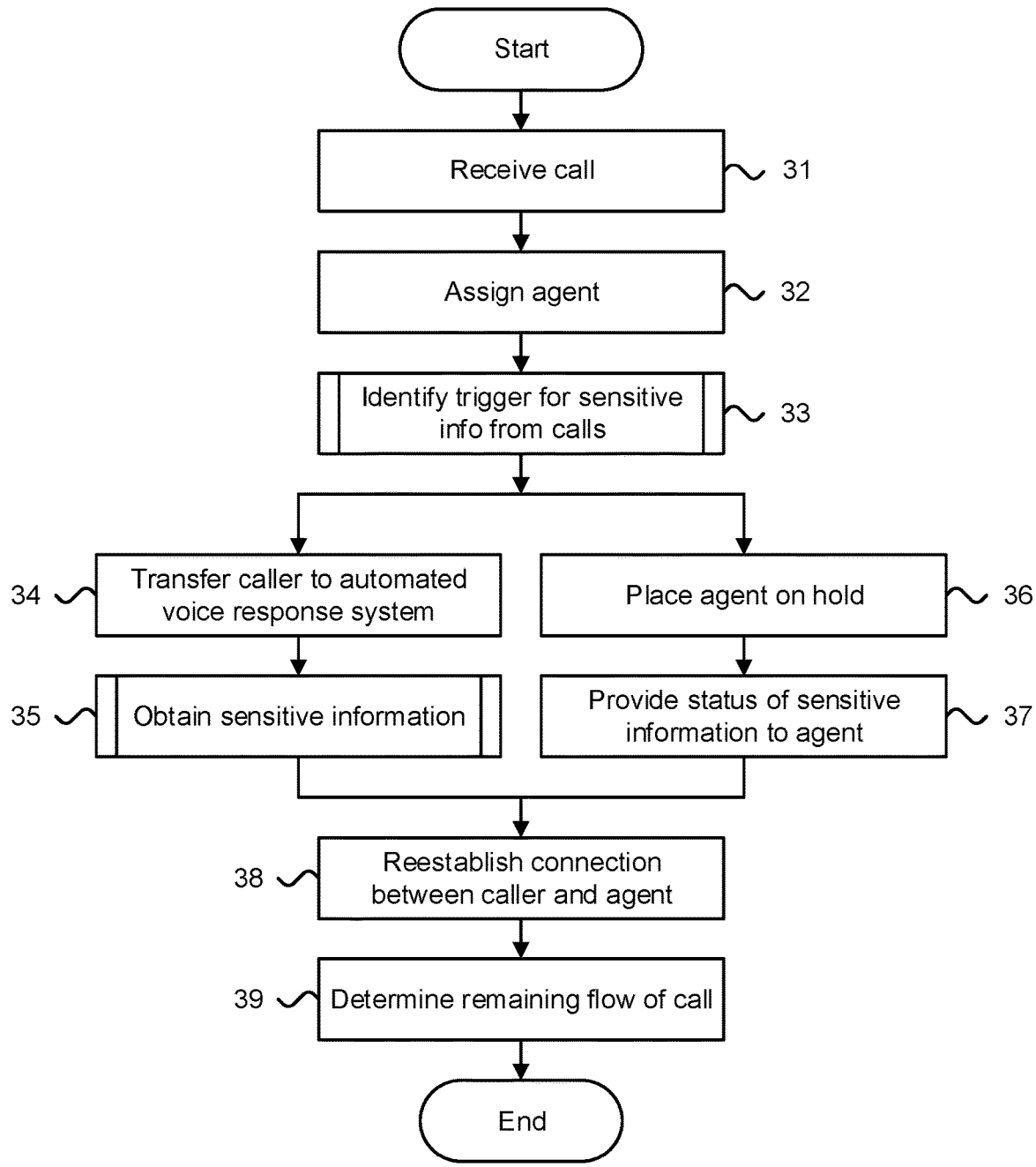
FIG. 2 is a flow diagram showing a method for protecting sensitive information within a call center in real time, in accordance with one embodiment.

Sensitive information can be protected in real time by bypassing the agent and using an IVR to collect the sensitive information during the call. FIG. 2 is a flow diagram showing a method 30 for protecting sensitive information within a call center in real time, in accordance with one embodiment. A call from a caller is received into the call center (block 31). The call can be conducted over the telephone network or via the Internet. An agent is assigned (block 32) to the call and can directly interact with the caller or can select a script, the content of which can be provided by the agent, via canned recordings, or via generated speech. Specifically, when the agent identifies a call that matches a recognized problem or frequently asked question, the agent can choose a predefined "script" to prompt and collect or simply provide the customer with information in a step-by-step manner. Throughout the conversation, the agent can change scripts, update the scripts, or terminate the scripts and speak directly with the agent. Thus, the ability of an agent to interact with customers through manually or automated text responses converted into speech or through pre-recorded or live voice responses provides a flexible and sliding level of agent control adaptable to a wide range of customer service situations.

During the call, the caller may be requested to provide information, some of which may be considered sensitive information. The content of the call, and actions performed by the caller or agent can be monitored to identify a trigger (block 33) for the anticipated disclosure of sensitive information by the caller. The trigger can include the selection of a button, identification of a marker, or identification of a keyword during the call that suggests that the caller will provide the sensitive information. Identifying the trigger is further discussed below with reference to FIGS. 4-8.

Once the trigger is identified, the caller is transferred (block 34) to an IVR for providing (block 35) the sensitive information, while the agent is placed on hold (block 36) and the call is maintained. For example, a caller wants to order shirts from Donna's Department Store, which maintains a call center for assisting customers. The caller dials the number for the call center and is eventually transferred to an agent. The agent identifies what items the customer wants to order, provides the total cost, and asks the customer for his credit card information. The phrase "credit card number" can be identified as a trigger, which predicts the receipt of sensitive information from the caller and prompts a transfer of the caller to the IVR. Obtaining the sensitive information via the IVR is further discussed below with reference to FIG. 9. After the sensitive information has been provided, a status of the information can be provided (block 37) to the agent. The status can include successful, unsuccessful, received, not received, error, or try again, as well as other statuses.

When the caller has finished providing the requested sensitive information, the caller is patched back (block 38) to the call with the agent. A remainder of the call flow can be determined (block 39) based on the status of the sensitive information. Returning to the above example, the caller provides his credit card information to the IVR, but the credit card has expired. After multiple attempts to run the credit card, a determination is made that the credit card is not successfully received by the IVR. The caller automatically rejoins the call and the agent receives a "failure" notice. The agent informs the caller that he cannot place the order until another credit card is provided. If the caller has a different credit card, the caller can again be transferred to the IVR for providing the new information. Once the credit card information is successfully obtained, the agent can place the order and inform the caller when to expect the order.

The sensitive information obtained from the caller can be stored in a database associated with the IVR and the call center for later use. Prior to storage, the sensitive information can be processed to prevent access of the information by unauthorized users. The masking can include reversible or irreversible encryption, deletion, or masking as described in commonly-owned U.S. Pat. No. 8,433,915, issued on Apr. 30, 2013, to Doren, and commonly-owned U.S. Pat. No. 7,996,230, issued on Aug. 9, 2011, to Doren, the disclosures of which are hereby incorporated by reference.

Additionally, any non-sensitive information received from the caller during the call can be entered into a user interface. As well, a status of the sensitive information can be entered to indicate whether sensitive information has been obtained. FIG. 3 is a screenshot showing, by way of example, a user interface 40 for entering caller information. The interface 40 can represent fields of information for a template 45, such as a caller record, retail order form, or request form. In this example, the template 45 represents an order form. The top left of the interface 40 can include the agent name and identification number, while the top right can include a date and time. Other information for displaying within the interface is possible. The order form displayed within the interface 40 can include sections for purchaser information 41 and retail purchase information 42. Fields of purchaser information can include name, identification number, address, credit card number, and expiration date, while purchase information fields can include item number, credit card confirmation, total cost, and a notes section. Other sections and information fields within the sections are possible.

Information that is not considered sensitive can be obtained by the agent and entered into the appropriate field, such as the caller's identification number or address. In contrast, sensitive information to be obtained from the caller is provided to an IVR, bypassing the agent. The fields for the sensitive information can be automatically populated based on a status of the sensitive information regarding retrieval by the IVR. The status can include "complete," "not complete," "received," "not received," "successful," "not successful," "stored," "not stored," or "error." Other statuses are possible, such as leaving the field blank when the sensitive information has not been received.

The information that qualifies as sensitive can be determined by collecting data from the call, such as the number dialed by the caller and a reason for the call, and using the collected data to determine those fields of sensitive information. Other call data is possible. A determination of sensitive information can vary based on the types of data collected, used, and maintained by the call center. For instance, a call center for a hospital collects patient information and is regulated under HIPAA. Examples of the sensitive information include an individual's past, present or future physical or mental health or condition, provision of health care provided, medical record number, health plan number, account number, as well as other types of information. If the call center is involved with credit card data, such as storing, processing, or transmitting the credit card data, sensitive information is defined under the PCI and can include cardholder data. The cardholder data can include account number, expiration date, name, address, and social security number.

The data collected from the call can be used to determine what is considered sensitive information based on the services provided by the call center, the assistance needed by the caller, and the information collected from the caller. For instance, the phone number of the call center can identify the type of call center and the regulations that apply to the call center, which is then used to determine the types of information, which are classified as sensitive and require protection. In one example, the phone number dialed by a caller is associated with a call center for a hospital, and the caller wants to make an appointment with a doctor because he believes he is coming down with a cold. The reason for making the appointment, such as a possible cold, and any symptoms described can be considered sensitive information since the call center is run by a health care provider and is regulated by HIPAA. Alternatively, if the caller dials a number for a retail catalog, any information shared with the agent regarding the caller's health condition is unlikely to be considered sensitive information.

In the example with respect to FIG. 3, the information regarding credit card number 43 and expiration date 44 are considered to be sensitive information. Thus, the data is obtained via the IVR and a status of the data can be entered into the information field 43, 44 for future use and to assist the agent in determining how to conduct the remainder of the call. For instance, when the credit card information is successfully received, the agent receives notice that the caller's credit card is on record and can process the order. The notice can include a pop up on the agent's computer screen, automatic population of the corresponding field within the template or form, or an audio message, as well as other types of notices. However, if the credit card information is not successfully received, alternate credit card information may need to be provided or the caller may need to call back at a later date to provide the credit card information for processing. Additionally, when the user calls back to place another order, the same credit card information can be used since the agent can look at the credit card field and determine that the caller's credit card is already on record. Therefore, the agent can immediately process the order without transferring the caller to the IVR to provide the sensitive information.

Figure 4:
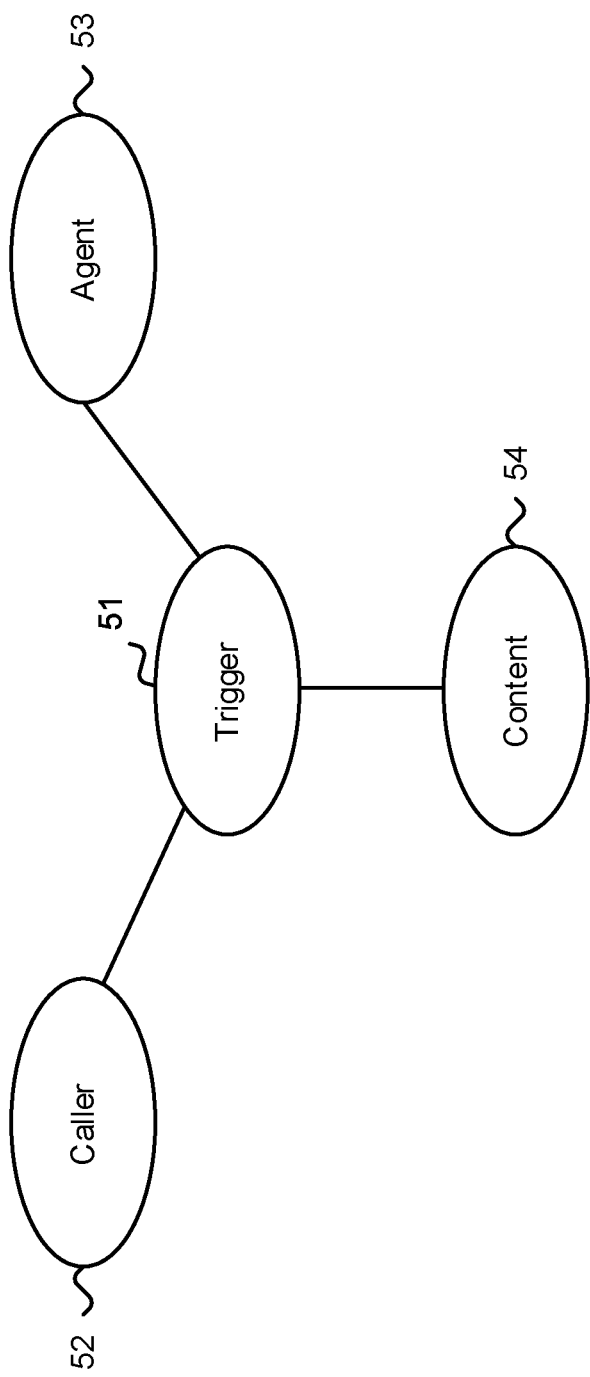
FIG. 4 is a data diagram showing, by way of example, triggers for prompting transfer of the caller to the IVR.

During the call, triggers can used to seamlessly transfer a caller to the IVR for providing sensitive information without ending the call with the agent. FIG. 4 is a data diagram 50 showing, by way of example, triggers 51 for prompting transfer of the caller to the IVR. The triggers can include caller actions 52, agent actions 53, and content transfer 54, which can be based on keywords or a script. The caller actions 52 can include instructions from the caller to transfer to the IVR, such as selection of a button or via voice instructions, as further described below with reference to FIG. 5. The actions 53 by the agent can include instructions or movements within the user interface, as further described below with reference to FIG. 6. The content transfer 54 can be based on one or more keywords, which when identified, such as in a script or by the agent, indicate a caller is about to provide sensitive information, as further described below with reference to FIGS. 7 and 8.

Figure 5:
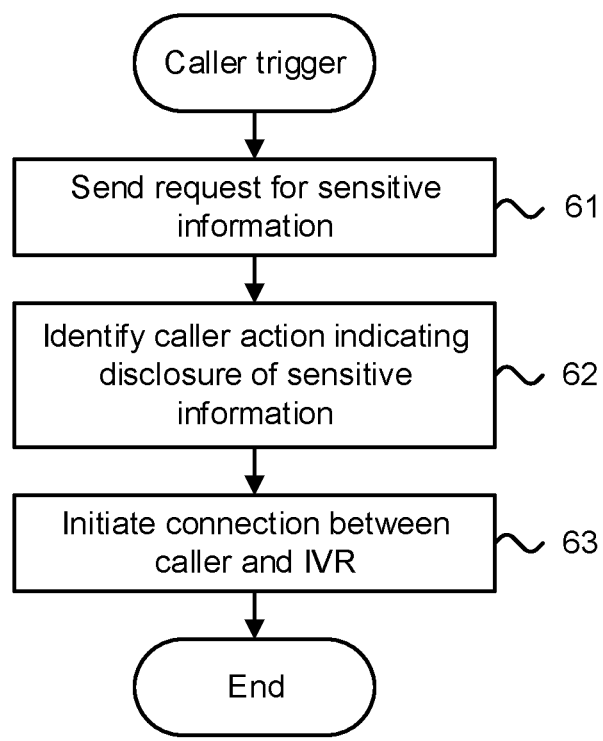
FIG. 5 is a flow diagram showing, by way of example, a process for identifying a caller trigger.

Callers can manually trigger transfer to the IVR when they are ready to divulge sensitive information. FIG. 5 is a flow diagram showing, by way of example, a process 60 for identifying a caller trigger. A request for sensitive information is made (block 61) by an agent or via a script. An example of a request can include "please provide your credit card number. Press the pound sign when you are ready to provide the requested information."

An action performed by the caller that indicates that sensitive information will soon be disclosed is identified (block 62). The action can include the selection of a button on a telephone, selection of a button on a computer application or Website, or voice instructions by the caller. An example of voice instructions by the caller can include, for example, "I am ready to give my credit card number." Other types of actions are possible.

The action serves as a trigger for initiating a connection (block 63) between the caller and the IVR, and can occur in response to the request for information provided by the agent or script, or as a stand alone action. Once the caller has been transferred to the IVR, the sensitive information can be provided. In the above-identified example, the caller is instructed to press the pound sign to provide the sensitive information. The selection of the pound sign on the telephone triggers the transfer of the caller to the IVR.

Figure 6:
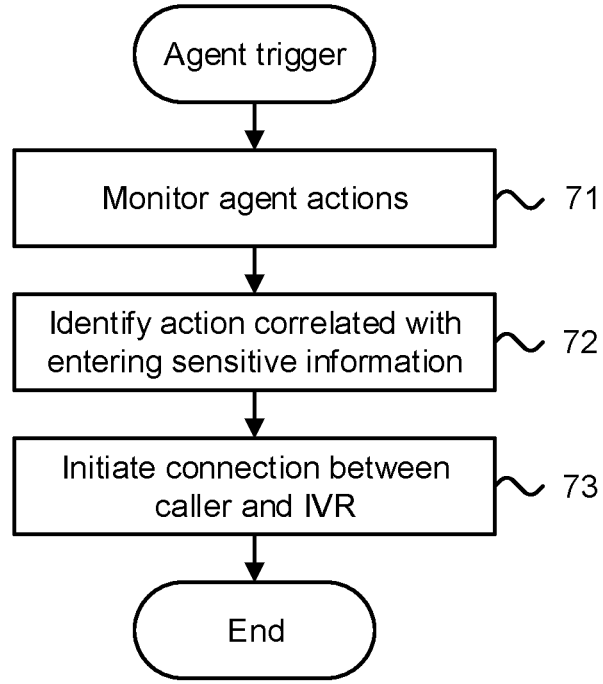
FIG. 6 is a flow diagram showing, by way of example, a process for determining an agent trigger.

Actions by the agent can also act as triggers to transfer the caller to the IVR. FIG. 6 is a flow diagram showing, by way of example, a process 70 for determining an agent trigger. During the call, actions performed by the agent with respect to the telephone or user interface are monitored (block 71). Those actions that indicate likely disclosure of sensitive information by the caller are identified (block 72). The identified actions can act as a trigger for initiating a connection (block 73) between the caller and the IVR so that the caller can provide the sensitive information to the IVR, rather than the agent.

The identified actions can include the selection of a button within the user interface or on the telephone. The button can include a specific button for transferring the caller, such as a "transfer" button within the user interface, or a button that is designated for such action, such as a button with the "#" symbol on the telephone. Other buttons are possible.

The actions can also include movement by a cursor or other type of pointer device, such as a stylus or finger, within the user interface that indicate probable entry of sensitive information within a field of the user interface. For example, the agent can enter information from the caller into the fields of the caller data template by placing a pointer device within the field and typing the information provided. When the agent reaches a field for collecting sensitive information, the agent may move the pointer device towards the field while asking the caller to provide the information. The movement of the pointer device can be correlated to the possible entry of sensitive information based on a trajectory of the pointer device, identification of an active field, or based on screen shots of the information fields taken over time, as described in detail in commonly-owned U.S. Pat. No. 8,433,915, issued on Apr. 30, 2013, to Doreen, and commonly-owned U.S. Pat. No. 9,336,409, issued on May 10, 2016, to Doren, the disclosures of which are hereby incorporated by reference.

To predict whether sensitive information will be provided by the caller, pointer device movement can be measured with respect to the fields of sensitive information. In one embodiment, each sensitive information field can include a first offset distance and a second offset distance. The first offset distance can include a boundary immediately surrounding the information field for sensitive information, while the second offset distance is a boundary that surrounds the first offset distance and the information field. Movement of the pointer device is tracked over time and if over time, the pointer device is moving closer to the sensitive information field, such that at a first time the pointer device is located at a point on or near the second offset distance and at a second time, the pointer device is located at a second point on or near the first offset distance, formation of a trajectory by the pointer device can be identified. The trajectory path of the pointer device is an agent action that indicates the possible entry of sensitive information and can trigger transfer of the caller to the IVR. Once, successfully obtained, a status of the sensitive information can populate the field.

Agent actions that act as a trigger for transferring the caller can also include activating a field of sensitive information via a pointer device. For instance, activation of a field can occur by hovering a pointer device, such as a cursor, over the field of sensitive information and pressing the left button on the mouse to select the field, by placing the cursor within the field, or by highlighting the field, as well as by other means. Activation of the information field indicates that sensitive information is about to be provided by the caller, which triggers transfer of the caller to the IVR to provide the sensitive information.

Figure 7:
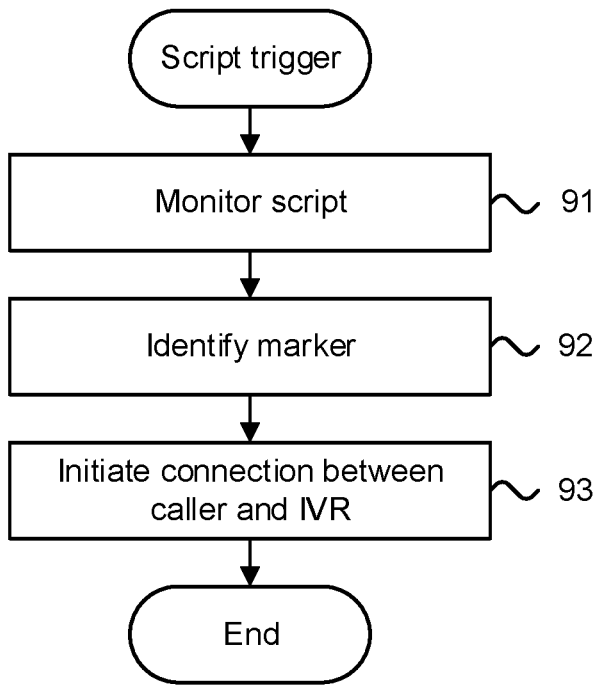
FIG. 7 is a flow diagram showing, by way of example, a process for determining trigger based on a script.

Markers located in a script can also be used as trigger for transferring the caller to the IVR. FIG. 7 is a flow diagram showing, by way of example, a process 90 for determining a trigger based on a script. During the call, a script is selected by the agent and information within the script is provided to the caller. For instance, the agent can manually follow the script by reading the script aloud to the caller. Alternatively, the content of the script can be prerecorded and played to the caller or can be transferred to a speech synthesizer that uses built-in dictionaries and pronunciation rules to generate speech, which is then played to the caller. The script is monitored (block 91) as content is relayed to the caller to identify areas of the script that request sensitive information by the caller. The particular areas in the script can be identified via a marker or keyword indicating a request for sensitive information (block 92) within the script. The marker can include a verbal cue, including a beeping noise or whisper, or a visual clue, including highlighting the question or a star next to the question within the script. Meanwhile, the keywords, or phrases of keywords, can include types of sensitive information, such as social security number, or other words that indicate the caller will provide sensitive information. Once identified, a connection between the caller and the IVR can be initiated (block 93) so that the caller can bypass the agent and securely provide the sensitive information to the IVR.

In a script-based example, a caller makes a call to the call center for La Boutique store to order a pair of slacks. Once received by the call center, the caller can communicate with an interactive voice response unit to determine a reason for the call. Subsequently, the call can be transferred to an automatic call distributor for assignment to an agent or can be placed into a queue until an agent becomes available. Since the caller wants to place an order, the agent selects a script for taking a customer order. The agent uses the script to ensure that all the information needed to place the order is obtained. The agent reads from the script, which includes the following:

Agent: Hi, my name is _____, I understand that you are interested in making a purchase today. What would you like to order?

Caller: [Wait for response].

Agent: What size would you like and how many _____ would you like to order?

Caller: [Wait for response].

Agent: You have selected to purchase the following items: _____. If your order is complete, how would you like to pay?

Caller: [Wait for response]. [If caller wants to pay by credit card, continue below. If by money order, please select Script #5443].

Agent: Please provide your credit card number and expiration date. [*Transfer*].

Agent: Thank you for providing your information.

In the above script, the marker includes the word "transfer," which can be used as a trigger to transfer the caller to the IVR. The transfer can occur automatically upon identification of the trigger or manually by the agent. When manually performed, the agent can select a "transfer" button or provide voice instructions, as described above with respect to FIG. 6. Alternatively, the keywords "credit card number" or "expiration date" can act as a trigger for the caller transfer.

Figure 8:
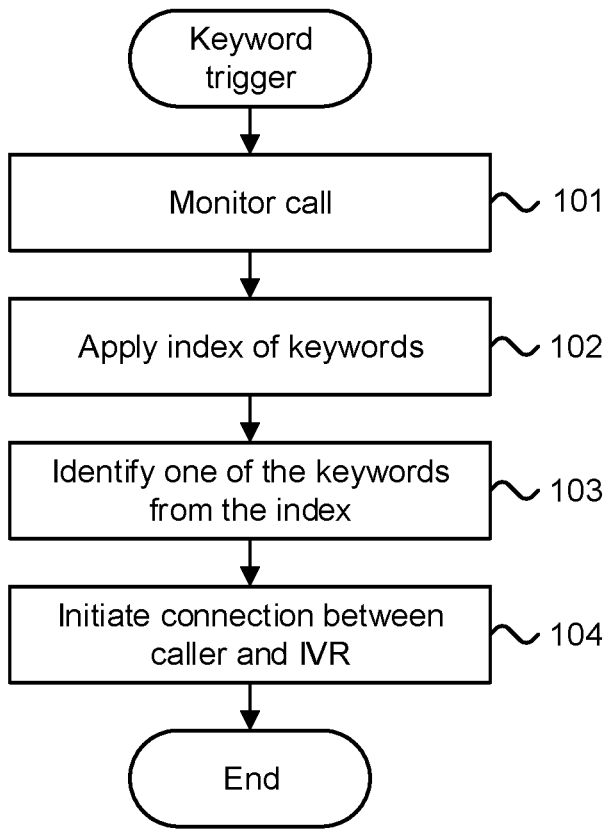
FIG. 8 is a flow diagram showing, by way of example, a process for identifying keyword triggers for connecting a caller with an IVR.

Other types of triggers are possible, including keywords identified during the call. FIG. 8 is a flow diagram showing, by way of example, a process for identifying keyword triggers for connecting a caller with an IVR. Content of the call between the caller and agent is monitored (block 101) for keywords or phrases that indicate the caller is likely to provide sensitive information, such as in requests for the sensitive data. A watcher can monitor the call by listening to the audio exchanged between the caller and the agent, or the caller and the prerecorded or synthesized speech. An index of keywords is applied (block 102) to the content of the call in real time and those keywords that match one or more of the keywords from the index are identified (block 103). The identification of one or more matching keywords serves as a trigger for initiating a connection (block 106) between the caller and an IVR.

For example, a caller makes a call to a call center for scheduling an appointment because he does not feel well.

The content of the call is monitored and an index of terms and phrases is applied to the content. The index can include terms related to sensitive information associated with health care, such as "health condition," "health status," "symptoms," "pain," "insurance company," and "plan number."

The content of the call includes the following:

Agent: Thank you for calling Roosevelt Health Plan Insurance. How can I help you?

Caller: I would like to schedule an appointment tomorrow with Dr. Moore.

Agent: Dr. Moore is available at 11 a.m. and 2:30 p.m. tomorrow. What is the reason for the visit?

Caller: My allergies are acting up. I will take the 2:30 p.m. appointment. Does my insurance cover the visit?

Agent: I am happy to check for you. What is the name of your insurance company and your plan number?

Caller: [provides sensitive information to the IVR].

Agent: [receives status that the sensitive information was successfully received]. Yes, your insurance will/will not cover the visit. Do you have any other questions?

Caller: No, not at this time.

Agent: We will see you tomorrow at 2:30 p.m. Goodbye.

The keywords "insurance company" and "plan number" are identified and can automatically trigger a transfer of the caller to the IVR. The audio path between the caller and the agent is put on hold and a new audio path is generated between the caller and the IVR. However, while the caller is communicating with the IVR, the call with the agent is still active. A message or music can be played to the agent while the caller is providing sensitive information to the IVR. The message can include updates on the information being provided to the IVR, such as "the caller is currently providing the information" or "we are checking the status of the information to ensure that the information is correct," or "the caller is repeating the information."

After the sensitive information has been successfully provided or the maximum number of attempts to provide the information has been reached, the caller rejoins the call with the agent. Before or after the call is resumed, a status of the sensitive information provided is transmitted to the agent. The status can include "information successfully received," "error," "please try again," or "need additional information." Other statuses are possible. The status assists the agents with determining how to progress the call. For instance, if the information is successfully received, the agent can continue with further requests for sensitive information or can terminate the call if no other information is needed. Alternatively, if the sensitive information is not successfully received, the agent may try to determine why the sensitive information was not received, such as whether the connection was bad, or whether the caller accidentally provided the wrong information, or may transfer the caller back to the IVR in a further attempt to obtain the sensitive information.

Returning to the above-identified example, when the health insurance information is successfully received, the agent should answer the caller's question regarding whether his insurance covers the visit to the doctors office. Since the agent knows that the insurance information was successfully received, but cannot access the data, information about the insurance coverage can be provided to the agent. For instance, the insurance can be reviewed by a third party who provides an answer to the agent for relaying to the caller or details of the insurance plan coverage can be provided to the agent for determining an answer without having access to the insurance plan number, type of insurance, or caller medical record. Alternatively, the answer can be automatically determined, such as by looking up the answer in an index stored in a database. Other methods for determining an answer to a caller question based on the sensitive data are possible.

The caller can be transferred to the IVR each time a keyword is identified or alternatively, all the sensitive information requested from the caller can be collected at the end of the call. The sensitive information collected by the IVR can be stored for current or later use. FIG. 9 is a flow diagram showing, by way of example, a process for obtaining sensitive information from a caller via an IVR. A prompt requesting the sensitive information is provided (block 111), such as repeating the request for sensitive information by the agent. Other prompts can include a beep to let the caller know when to provide the information or a generic message directing the caller to provide the information requested from the agent. Subsequent to the prompt, the caller can provide the sensitive information, which is received (block 112) by the IVR.

A quality of the sensitive information is examined (block 113) to determine whether the information is satisfactorily (block 114) received. For instance, returning to the above example regarding a health care call center, the caller can provide the insurance company name and health plan number to the IVR. However, upon examination, a determination can be made that the health plan number was not correctly received. For instance, the health plan number provided may not include the correct amount of numbers for that insurance company or due to background noise, only a portion of the plan number was received. Other reasons for incorrectly receiving the sensitive information are possible, such as the caller did not clearly relay the information or the caller was not ready to provide the information. Additionally, if a caller is providing credit card information, a determination can be made whether the credit card can be processed for the amount to be charged to the caller. If not, the sensitive information received may be unsatisfactory and alternative credit card information should be provided.

If the sensitive information is satisfactorily received, the audio path between the caller and the IVR can be terminated (block 117) and the call between the caller and the agent can resume. However, if the sensitive information is not satisfactorily received, a quality threshold is applied (block 115) to a number of times that the sensitive information has been provided by the caller. The quality threshold can be used to ensure that the caller is given enough chances to provide the sensitive information without annoying or frustrating the caller. In one example, the quality threshold can be set at three. If the threshold has been met (block 116), such that the caller has provided the sensitive information three times and the information is still not correctly or satisfactorily received, the audio path between the caller and the IVR can be terminated (block 117) and the caller can be transferred back to the agent to continue the call or to determine why the sensitive information was not successfully provided. Alternatively, if the quality threshold is not yet met (block 116), the IVR can ask that the caller again provide the requested sensitive information (block 112).

The sensitive data obtained by the IVR can be stored and used as necessary. For instance, any credit card information obtained from the caller can be used to complete a current purchase order, as well as a future purchase order. Returning to the above discussion with respect to FIG. 3, data fields for credit card number and expiration date within a user interface can be filled with the terms "stored" or "filed," as well as with other terms to indicate that the agent or call center has previously obtained the information, which can be used. The next time the caller calls the call center to place an order, the same credit card information can be used. For example, the agent can ask the caller whether he prefers to use the credit card on file for the purchase or a different card. If the caller wants to use the credit card on file, the sensitive information can be obtained from storage and processed without providing any of the sensitive information to the agent. However, if the caller wishes to use a different credit card or revise the credit card on file, such as by providing a new expiration date, the caller can be transferred to the IVR for providing the information.

Although the above description utilizes an automated IVR for collecting sensitive information, a third party service can also be used to the collect the information. Use of the third party can help prevent breach as only the sensitive information is available to the third party without any further identification of the caller. For instance, a caller speaking with an agent at the call center may wish to order three sweaters from an online catalog. The agent asks for and enters non-sensitive data, such as the user's name, address, and telephone number, into a user interface. When the credit card information is to be obtained, the caller is transferred to a third party and the credit card information is provided. The third party only has access to the credit card information without knowing the identity of the caller or the caller's address. Thus, even if a breach were to occur of the third party services, the credit card information by itself or only with the expiration date is not sufficient for identifying the associated owner or for using the card for unauthorized purchases.

In a further embodiment, the sensitive information collected via an IVR can be stored and retrieved by an agent while maintaining privacy of the data. FIG. 10 is block diagram showing, by way of example, a process for storing and retrieving sensitive information. Sensitive information is received (block 121) from the caller via the IVR, as described above with respect to FIG. 2. At a time prior to, during, or after receipt of the information from the agent, the IVR generates a reference number for the sensitive information to be retrieved and provided (block 122) to an agent. Specifically, the IVR encrypts and stores the sensitive information of each transaction in a database, together with a unique random identification or reference number. The IVR uses an individual one time encryption key for each transaction, which is not stored. The IVR creates a reference code that can later be used to locate the sensitive information and recreate the key.

The agent can then enter (block 123) the reference number into a data entry system, such as a customer relationship management (CRM) system, to retrieve the sensitive information. The information can be retrieved to populate a field in the CRM and can be obfuscated, such that the agent still cannot access the information. The CRM can then initiate (block 124) communication with the IVR and provide (block 125) the IVR with the reference number for the sensitive information desired by the agent. Finally, the IVR performs a verification process to verify the reference number and access the sensitive information associated with the reference number for providing (block 126) to the IVR.

The CRM uses a secure method of communications, whose credentials are only valid for the purpose of retrieving the sensitive information and are only shared between the CRM and the IVR. The credentials for the CRM can include digital certificates, user name and passwords, program name, IP addresses, and encryption keys, as well as other types of credentials. Since only the CRM has both the reference code and the credentials required to contact the IVR for the purpose of retrieving the sensitive information, no other entity can access that information. Further, an attacker gaining access to the IVR's database, via some other means, will not be able to get access to the sensitive information because the keys are not stored on that system. However, even if the attacker succeeds in breaking the key of one of the stored transactions, that will not compromise the other transactions.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for protecting sensitive information, the method comprising:
    monitoring, by a server associated with a call center, a call between an agent of the call center and a customer;
    providing, by the server, a user interface comprising one or more fields for entering sensitive information;
    identifying, by the server, a trigger indicating anticipated disclosure of the sensitive information during the call, wherein the trigger comprises an agent action comprising activation of one of the fields for entering sensitive information or movement of a pointer device to within a predetermined distance of one of the fields for entering sensitive information;
    transferring, by the server, the call to one of (i) an automated resource associated with the call center, or (ii) a third party service, for collection of the sensitive information; and
    receiving, by the server from the automated resource or the third party service, a notification comprising a status of the sensitive information, wherein the status indicates whether the sensitive information is successfully received or not successfully received.

2. The method of claim 1, wherein the call comprises a first audio path between the agent and the customer and transferring the call comprises placing the agent on hold and establishing a second audio path between the customer and the automated resource or the third party service, the method further comprising:
    after receiving the notification, reestablishing, by the server, the first audio path between the customer and the agent.

3. The method of claim 1, wherein the trigger further comprises a customer action.

4. The method of claim 1, wherein the trigger further comprises call content, the call content comprising one or more of a marker in a script and a keyword in the script.

5. The method of claim 1, wherein identifying the trigger further comprises:
    applying an index of keywords to a content of the call; and
    identifying a match between the content of the call and one or more of the keywords from the index.

6. The method of claim 1, wherein the automated resource comprises an interactive voice response system.

7. The method of claim 1, wherein the call comprises a first audio path between the agent and the customer and transferring the call comprises placing the agent on hold and establishing a second audio path between the customer and the automated resource or the third party service, the method further comprising:
    after receiving the notification, terminating, by the server, the second audio path between the customer and the automated resource or the third party service; and
    reestablishing, by the server, the first audio path between the customer and the agent.

8. The method of claim 7, further comprising:
when the status indicates that the sensitive information is successfully received, determining, by the server, a remaining flow of the call; and
when the status indicates that the sensitive information is not successfully received, transferring, by the server, the call back to the automated resource or the third party service.

9. A system for protecting sensitive information, the system being associated with a call center and comprising:
a memory device storing executable code; and
a server comprising a processor in communication with the memory device, wherein the processor when executing the executable code:
monitors a call between an agent of the call center and a customer;
provides, to the agent, a user interface comprising one or more fields for entering sensitive information;
identifies a trigger indicating anticipated disclosure of the sensitive information during the call, wherein the trigger comprises an agent action comprising activation of one of the fields for entering sensitive information or movement of a pointer device to within a predetermined distance of one of the fields for entering sensitive information;
transfers the call to one of (i) an automated resource associated with the call center, or (ii) a third party service, for collection of the sensitive information; and
receives, from the automated resource or third party service, a notification comprising a status of the sensitive information, wherein the status indicates whether the sensitive information is successfully received or not successfully received.

10. The system of claim 9, wherein the call comprises a first audio path between the agent and the customer and transferring the call comprises placing the agent on hold and establishing a second audio path between the customer and the automated resource or the third party service, wherein the processor when executing the executable code:
after receiving the notification, reestablishes the first audio path between the customer and the agent.

11. The system of claim 9, wherein the trigger further comprises a customer action.

12. The system of claim 9, wherein the trigger further comprises call content, the call content comprising one or more of a marker in a script and a keyword in the script.

13. The system of claim 9, wherein identifying the trigger further comprises:
applying an index of keywords to a content of the call; and
identifying a match between the content of the call and one or more of the keywords from the index.

14. The system of claim 9, wherein the automated resource comprises an interactive voice response system.

15. The system of claim 9, wherein the call comprises a first audio path between the agent and the customer and transferring the call comprises placing the agent on hold and establishing a second audio path between the customer and the automated resource or the third party service, wherein the processor when executing the executable code:
after receiving the notification, terminates the second audio path between the customer and the automated resource or the third party service; and
reestablishes the first audio path between the customer and the agent.

16. The system of claim 15, wherein the processor when executing the executable code:
when the status indicates that the sensitive information is successfully received, determines a remaining flow of the call; and
when the status indicates that the sensitive information is not successfully received, transfers the call back to the automated resource or the third party service.

* * * * *